United States Patent
Bühle et al.

(10) Patent No.: US 11,635,136 B2
(45) Date of Patent: Apr. 25, 2023

(54) METHOD AND CONTROL UNIT FOR OPERATING A POWER-SHIFT TRANSMISSION

(71) Applicant: ZF Friedrichshafen AG, Friedrichshafen (DE)

(72) Inventors: Felix Bühle, Eriskirch (DE); Frank Deprez, Mariabrunn (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 94 days.

(21) Appl. No.: 17/423,564

(22) PCT Filed: Jan. 16, 2020

(86) PCT No.: PCT/EP2020/050964
§ 371 (c)(1),
(2) Date: Jul. 16, 2021

(87) PCT Pub. No.: WO2020/148361
PCT Pub. Date: Jul. 23, 2020

(65) Prior Publication Data
US 2022/0112948 A1 Apr. 14, 2022

(30) Foreign Application Priority Data

Jan. 17, 2019 (DE) .................. 10 2019 200 535.7

(51) Int. Cl.
*F16H 59/14* (2006.01)
*F16H 61/02* (2006.01)

(52) U.S. Cl.
CPC ....... *F16H 59/141* (2013.01); *F16H 61/0213* (2013.01); *F16H 2059/147* (2013.01); *F16H 2059/148* (2013.01); *F16H 2306/42* (2013.01)

(58) Field of Classification Search
CPC ............ F16H 59/141; F16H 2059/147; F16H 2059/148; F16H 61/0213; F16H 2306/42; F16H 2061/1212
See application file for complete search history.

(56) References Cited

U.S. PATENT DOCUMENTS 5,016,494 A * 5/1991 Yamaguchi ............ B60W 10/11
477/109
8,868,271 B2 10/2014 Kim
(Continued)

FOREIGN PATENT DOCUMENTS

DE 102007055830 A1 6/2009
DE 102009028121 A1 2/2011
(Continued)

OTHER PUBLICATIONS

International Search Report (English Translation) PCT/EP2020/050964, dated Apr. 6, 2020. (2 pages).
(Continued)

*Primary Examiner* — Edwin A Young
(74) *Attorney, Agent, or Firm* — Dority & Manning, P.A.

(57) ABSTRACT

A method for operating a power shiftable transmission of a motor vehicle, the transmission including a control unit, an input shaft, an output shaft, a gear set, and multiple shift elements, the method including transmitting, with the control unit, a request for a reduction of a drive torque acting on the input shaft for carrying out an upshift, and determining, with the control unit, whether the reduction is completely possible, partially possible, or impossible based on a signal. When the reduction is completely possible, the method includes controlling, with the control unit, a torque transmission rate of a shift element of the multiple shift elements to be engaged during the upshift according to a first way. When the reduction is partially possible or impossible, the (Continued)

method includes controlling, with the control unit, the torque transmission rate according to a second way, the second way differing from the first way.

14 Claims, 3 Drawing Sheets

(56) References Cited

U.S. PATENT DOCUMENTS

| | | |
|---|---|---|
| 8,942,879 B2 | 1/2015 | Tsuda et al. |
| 2007/0287589 A1* | 12/2007 | Kadono ................. B60W 10/11 477/110 |
| 2008/0051254 A1 | 2/2008 | Satou et al. |
| 2009/0118084 A1 | 5/2009 | Heap et al. |
| 2011/0093147 A1 | 4/2011 | Kaltenbach et al. |
| 2013/0197769 A1* | 8/2013 | Schneider ........... F16H 61/0403 |

FOREIGN PATENT DOCUMENTS

| | | |
|---|---|---|
| DE | 102012223483 A1 | 4/2014 |
| DE | 112013000244 T5 | 8/2014 |
| EP | 1895202 A2 | 3/2008 |
| EP | 2056001 A2 | 5/2009 |
| WO | WO 2009/077321 | 6/2009 |
| WO | WO 2013/111866 | 8/2013 |

OTHER PUBLICATIONS

German Search Report 10 2019 200 535.7, dated Nov. 6, 2019. (14 pages).

* cited by examiner

METHOD AND CONTROL UNIT FOR OPERATING A POWER-SHIFT TRANSMISSION

CROSS-REFERENCE TO RELATED APPLICATION

The present application is related and has right of priority to German Patent Application No. 10 2019 200 535.7 filed on Jan. 17, 2019 and is a nationalization of PCT/EP2020/050964 filed in the European Patent Office on Jan. 16, 2020, both of which are incorporated by reference in their entirety for all purposes.

FIELD OF THE INVENTION

The invention relates generally to a method for operating a power shiftable transmission, in particular for the application in a motor vehicle. The invention further relates to a control unit, which is configured for carrying out a method of this type.

BACKGROUND

Patent application DE 10 2007 055 830 A1 describes a method for operating a hybrid drive of a vehicle. This patent application indicates that, in a drive train including a powershift transmission, the drive torque of a prime mover operatively connected to the transmission is to be reduced during an upshift in the traction operation. The object is to avoid an excessive torque increase on the output end, which adversely affects comfort and which arises due to the moments of inertia to be decelerated during the upshift process.

The amount by which the drive torque is to be reduced is proportional to the amount of the moment of inertia to be decelerated during the upshift process. Consequently, the reduction amount in the case of a hybrid drive train with a large-volume internal combustion engine and a powerful electric machine connected thereto is greater than in the case of a conventional drive train with a relatively small internal combustion engine. In the first case, the reduction amount is so great that the internal combustion engine must switch to the coasting condition, although this is an upshift in the traction operation. The amount by which the drive torque is to be reduced is also proportional to the shifting speed. The faster the gear shift is to be concluded, the greater is the extent by which the drive torque must be reduced. There is also a dependence on the rotational speed of the moment of inertia to be decelerated. The higher the rotational speed of the moment of inertia to be decelerated, the greater is the extent by which the drive torque must be reduced. Particularly in the case of gear shifts taking place quickly at a high rotational speed and a low load, this makes it necessary for the internal combustion engine to switch into the coasting operation, although this is an upshift in the traction operation. This can also happen in the case of an internal combustion engine with a relatively low moment of inertia.

However, a changeover of the internal combustion engine from the traction operation into the coasting condition is not permissible in all operating conditions. For example, an exhaust system of the internal combustion engine may have a particle filter, to which no unburned oxygen may be supplied in a regeneration phase. In addition, the catalytic converter in the exhaust gas train can cool down too quickly due to the excessive supply of unburned air, and so the catalytic converter becomes damaged.

If an electric machine is an integral part of the moment of inertia to be decelerated, this electric machine is usable for deceleration. However, an operation of the electric machine as a generator, which is necessary therefor, is not permissible in all operating conditions, for example, at an excessive temperature of the electric machine or when the electrical energy accumulator is fully charged.

SUMMARY OF THE INVENTION

The problem addressed by the invention is therefore that of providing a method, which allows for a comfortable shift sequence.

A method is provided for operating a power shiftable transmission of a motor vehicle, wherein the transmission includes a control unit, an input shaft, an output shaft, a gear set, and multiple shift elements. The shift elements interact with the gear set for providing various gear ratios between the input shaft and the output shaft. The shift elements are actuatable, for example, hydraulically or electromechanically. If an upshift is now to be carried out in the transmission, the control unit requests a reduction of the torque that acts upon the input shaft. The request is transmittable, for example, to a further control unit, which controls a drive source connected to the input shaft by an open-loop or closed-loop system. The drive source is, for example, an internal combustion engine or an electric machine. Alternatively, the request is transmittable to a further control unit, which coordinates a torque output of an internal combustion engine and of an electric machine. A torque transmission rate of the shift elements is controlled by an open-loop or closed-loop system by the control unit.

According to the invention, a torque transmission rate of a shift element of the multiple shift elements to be engaged during the upshift is controlled by an open-loop or closed-loop system depending on the available or potential reduction of the drive torque. For this purpose, the control unit receives a signal indicating whether the reduction of the torque acting upon the input shaft is completely possible, only partly possible, or not at all possible. In one embodiment, the signal directly indicates whether the reduction of the torque acting upon the input shaft is completely possible, only partly possible, or not at all possible. Alternatively, the signal is indirectly indicative of whether the reduction of the torque acting upon the input shaft is completely possible, only partly possible, or not at all possible, such that the control unit itself calculates, based on the received signal, whether the reduction of the torque acting upon the input shaft is carried out completely, only partly, or not at all. For example, the received signal can contain only the information regarding the maximum or minimum possible drive torque. The evaluation or calculation regarding whether the maximum or minimum drive torque is sufficient is carried out by the control unit itself. If the reduction of the drive torque is completely carried out, the torque transmission rate of the shift element to be engaged during the upshift is controlled by an open-loop or closed-loop system in a first way. If the reduction of the drive torque could not be carried out or could only be partly carried out, the torque transmission rate of the shift element to be engaged during the upshift is controlled by an open-loop or closed-loop system in a second way. The second way differs from the first way.

The shifting comfort is improved by influencing the torque transmission rate of the shift element to be engaged depending on the available drive torque reduction.

Preferably, the torque transmission rate of the shift element to be engaged during the upshift is set higher, at least at the beginning of the upshift, if the available drive torque reduction is less than the requested specified value. Preferably, an amount of the value, by which the torque transmission rate is increased at the beginning of an upshift according to the second way, is proportional to the extent by which the drive torque is reducible for the upshift. If, for example, there is no drive torque reduction available at all, the torque transmission rate is increased by a greater amount than in a situation, in which at least a portion of the requested drive torque reduction is available. A dependence of this type is stored in the control unit, for example, as a characteristic map. As a result, the shifting comfort is reduced only by the strictly necessary amount as compared to an upshift according to the first way.

It is particularly preferred when the torque transmission rate is increased by a lesser amount during an upshift according to the second way than during an upshift according to the first way. As a result, the thermal load on the shift element is limited.

According to a first possible embodiment, a duration of the upshift is the same, regardless of whether the upshift is carried out according to the first way or according to the second way. As a result, a thermal load on the shift elements is limited during the upshift. This is relevant, in particular, during a constant acceleration process of the motor vehicle. This is the case because an increased duration of the upshift not only prolongs the duration, in which the shift element to be engaged is in the slip state and, thereby, is thermally loaded. Additionally, it is to be taken into account that the available cool-down period between consecutive gear shifts is shortened.

According to a second possible embodiment, the duration of the upshift is prolonged if the drive torque reduction cannot or cannot completely be carried out. A response of this type is advantageous, in particular, during an upshift with relatively little drive torque, in the case of which the thermal load on the shift element to be engaged is relatively low. In a utilization of the method in a planetary gear set-based automatic transmission, a method of this type is additionally dependent on the shift element to be engaged. This is the case because, due to the coupling of the individual elements of the planetary gear sets, high amplification factors result for individual shift elements, which limit a prolongation of the upshift duration also when drive torque is low.

In the method according to the second possible embodiment, the upshift duration is preferably longer by a fixedly predefined amount, which is invariable. As a result, the thermal load on the shift element to be engaged is limited.

In the method according to the second possible embodiment, the torque transmission rate of the shift element to be engaged is preferably set at a lower value than in the case of an upshift according to the first way. Due to the combination of the longer upshift duration and the reduction of the torque transmission rate, a good shifting comfort is ensured when a drive torque reduction is incomplete.

The control unit is configured for the open-loop control of functions of the power shiftable transmission, in particular for carrying out the above-described method. The control unit includes a communication interface, which is configured for exchanging data with the at least one further control unit. The request to reduce the drive torque acting upon the input shaft takes place via this communication interface. The reception of the signal indicating whether the reduction of the drive torque acting upon the input shaft cannot, cannot completely, or can completely be carried out also takes place via this communication interface. The reception of the signal, based on which the control unit calculates whether the reduction of the drive torque acting upon the input shaft cannot, cannot completely, or can completely be carried out, also takes place via this communication interface.

BRIEF DESCRIPTION OF THE DRAWINGS

Exemplary embodiments of the invention are described in detail in the following with reference to the attached figures, wherein.

DETAILED DESCRIPTION

Figure 1:
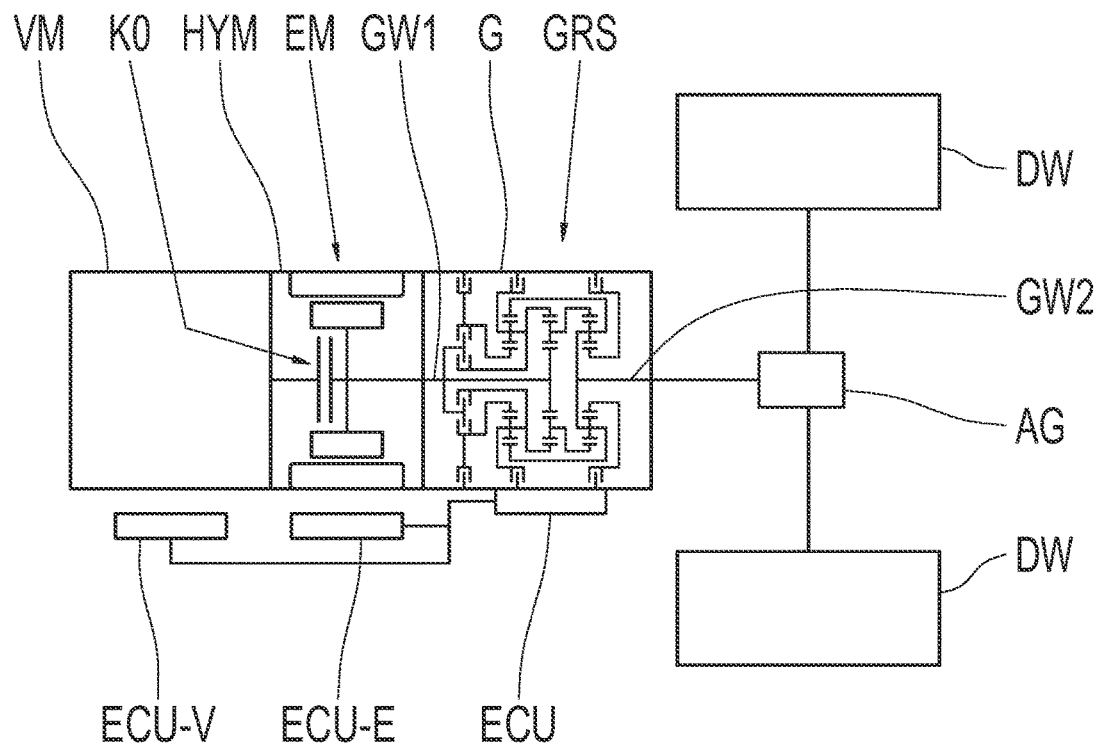
FIG. 1 shows a first example of a drive train for a motor vehicle.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 schematically shows a drive train for a motor vehicle with a hybrid drive. The drive train includes an internal combustion engine VM, a transmission G, and a hybrid module HYM arranged therebetween. The hybrid module HYM includes an electric machine EM and a separating clutch K0. A rotor of the electric machine EM is connected to an input shaft GW1 of the transmission G. The separating clutch K0 is utilized for disengageably or selectively coupling the internal combustion engine VM to the transmission G. The transmission G includes a gear set GRS, which, by way of example, has multiple planetary gear sets. By selectively actuating shift elements of the transmission G, multiple gear steps or ratios are engageable by the planetary gear sets between the input shaft GW1 and an output shaft GW2 of the transmission G. The actuation of the shift elements is controlled by an open-loop or closed-loop system by a control unit ECU. The output shaft GW2 of the transmission G is connected to a differential gear AG, for example, via a cardan shaft. The power present at the output shaft GW2 is distributed to driving wheels DW of the motor vehicle via the differential gear AG. The drive train is aligned longitudinally with respect to the direction of travel of the motor vehicle.

The control unit ECU includes a communication interface, which is configured to allow the control unit ECU to exchange data with at least two further control units, including an electric machine control unit ECU-E and an internal combustion engine control unit ECU-V. The electric machine control unit ECU-E is configured for the open-loop control of the electric machine EM. The internal combustion engine control unit ECU-V is configured for the open-loop control of the internal combustion engine VM. The control units ECU, ECU-E, ECU-V are connected to each other via a data bus for data transmission.

Figure 2:
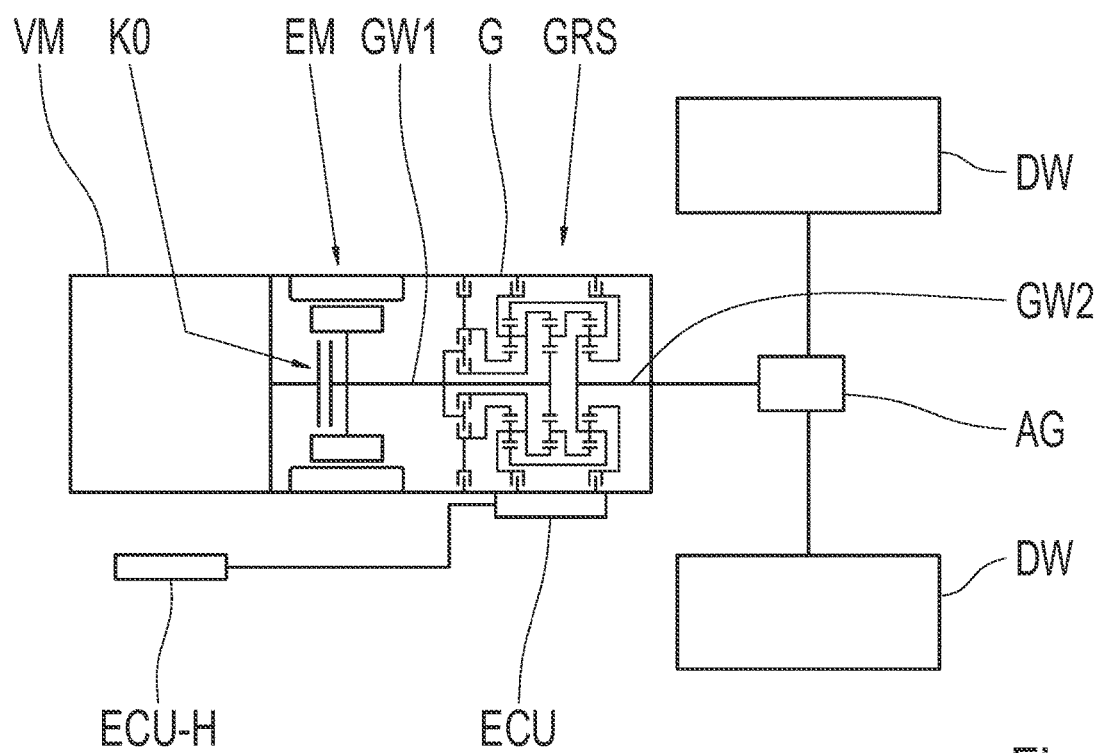
FIG. 2 shows a second example drive train for a motor vehicle.

FIG. 2 schematically shows a drive train for a motor vehicle, which essentially corresponds to the drive train represented in FIG. 1, except that the electric machine EM and the separating clutch K0 are now integrated into the transmission G; the hybrid module is therefore omitted. The control unit ECU is now connected to a further control unit ECU-H for data transmission. The further control unit ECU-H is configured for coordinating a torque output of the internal combustion engine VM and of the electric machine EM.

The drive trains represented in FIG. 1 and FIG. 2 are to be considered merely as examples. Instead of, or in addition to, the planetary gear sets, spur gear stages could be utilized for forming gears. As another example, a torque converter could be utilized as a starting component, for example, between the rotor of the electric machine EM and the input shaft GW1 of the transmission G. As a further example, the drive train could be aligned transversely to the direction of travel of the motor vehicle. As an additional example, the drive train could be designed without an electric machine.

The transmission G can switch between various gear ratios by targeted disengagement and engagement of the shift elements. Here, an upshift process is differentiated from a downshift process. During an upshift process, a rotational speed of the input shaft GW1 is lower in the new gear ratio than in the original gear ratio. During a downshift process, the rotational speed of the input shaft GW1 is higher in the new gear ratio than in the original gear ratio. The gear ratios of the transmission G are power shiftable, i.e., without a complete interruption of the torque transmission between the input shaft GW1 and the output shaft GW2 during the gear shift. For this purpose, usually a torque-transmitting shift element is disengaged and a non-torque-transmitting shift element is engaged.

Figure 3:
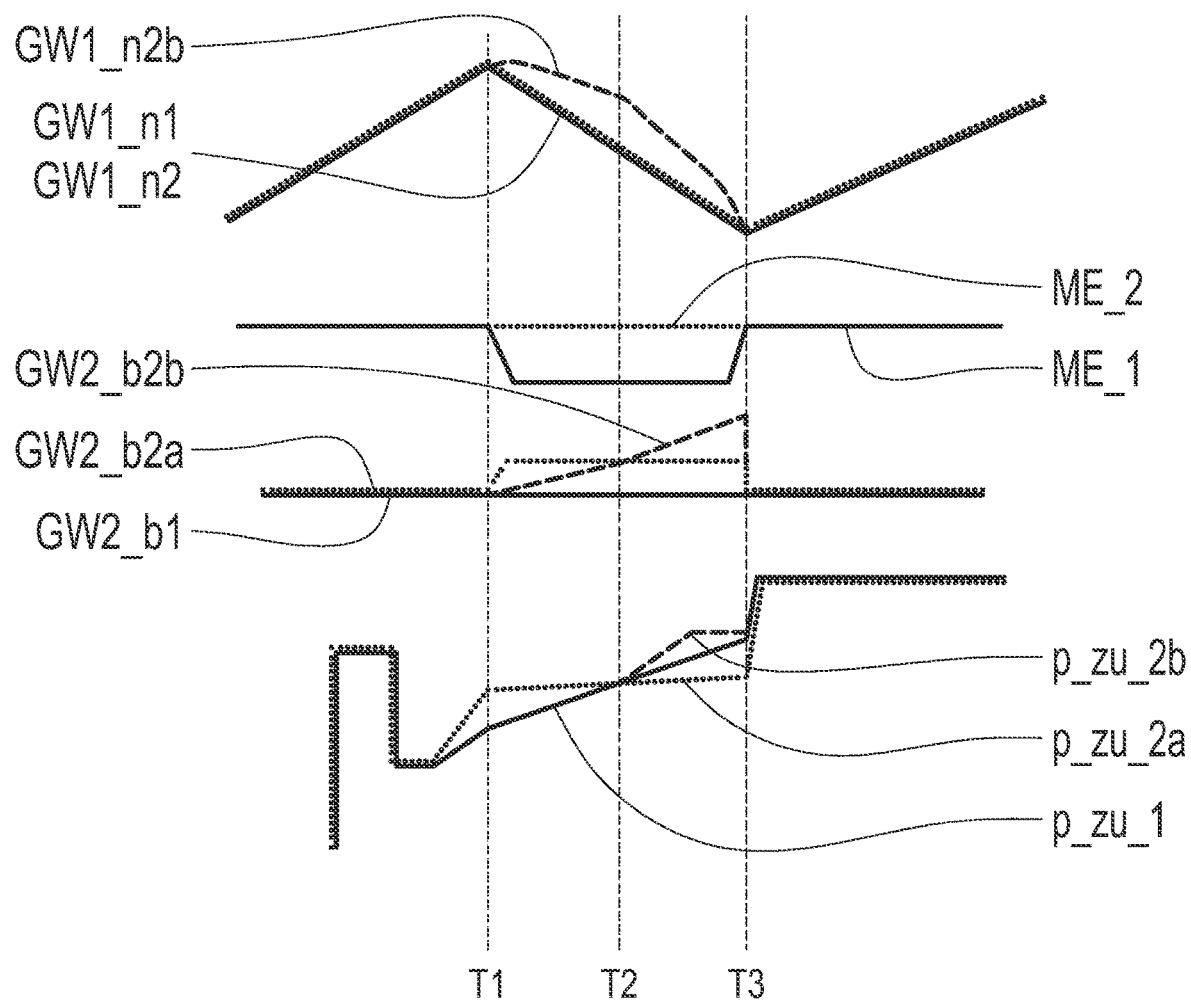
FIG. 3 shows a first example time sequence of various variables of a drive train.

FIG. 3 shows time profiles of various variables of the transmission G during different variants of an upshift, including a rotational speed $GW1\_n$ of the input shaft GW1, a torque ME acting upon the input shaft GW1, an acceleration $GW2\_b$ of the output shaft GW2, and an actuation profile $p\_zu$ of an actuator, by which a torque transmission rate of the shift element to be engaged during the upshift is influenced. The upshift begins at the point in time T1 and ends at the point in time T3, as is apparent from the profile of the rotational speed $GW1\_n$.

During the deceleration of the input shaft GW1, energy from the inertia of the input shaft GW1 and of the elements connected thereto is released. In the absence of further measures, this energy is transmitted to the output shaft GW2, which results in an excessive acceleration of the motor vehicle. The amount of this energy depends on the inertia of the elements connected to the input shaft GW1, i.e., for example, the rotor of the electric machine EM and, when the separating clutch K0 is engaged, also the inertia of a crankshaft of the internal combustion engine VM. In addition, there is also the inertia of possibly present intermediate elements such as a torsional vibration damper and a centrifugal pendulum absorber.

The electric motor EM and/or the internal combustion engine VM influence the torque acting upon the input shaft GW1. The profile ME_1 shows a reduction of the torque acting upon the input shaft GW1 during the upshift. The amount of this torque reduction is selected such that the energy released during the deceleration of the input shaft GW1, as shown by the profile GW1_n1, is compensated for by the torque reduction. As a result, the acceleration $GW2\_b$ of the output shaft GW2 remains constant during the upshift, as shown by the profile GW2_b1. For an upshift of this type, the torque transmission rate of the shift element to be engaged during the upshift is carried out in a first way, which is shown in the profile p_zu_1. For this purpose, a hydraulic actuator of the shift element is initially pre-filled before the start of the upshift. Thereafter, a filling equalization phase takes place. Subsequent thereto, a continuous increase of the torque transmission rate of the shift element to be engaged takes place. If the upshift has been concluded at the point in time T3, the torque transmission rate of the shift element to be engaged is further increased, and so an elevated drive torque can also be reliably transmitted.

For various reasons, a reduction of the torque acting upon the input shaft GW1 is not always possible, as represented in the profile ME_2. In the absence of further measures, the energy released due to the deceleration of the input shaft GW1 is introduced into the output shaft GW2, and so the acceleration of the output shaft GW2b is increased, as represented in the profile GW2_b2b. The input shaft GW1 decelerates correspondingly more slowly up to the point in time T2, as represented in the profile GW1_n2b. At the point in time T2, the control unit ECU detects—based on the signal of at least one speed sensor—that the rotational speed $GW1\_n$ decreases too slowly. In response thereto, the torque transmission rate of the shift element to be engaged is increased, as is apparent from the profile p_zu_2b. As a result, the acceleration of the output shaft GW2b continues to increase. If the upshift has been concluded at the point in time T3, the acceleration of the output shaft GW2b abruptly decreases. This is distinctly noticeable for occupants of the motor vehicle.

In order to avoid this considerable drop in acceleration, the control unit ECU receives a signal indicating that the reduction of the torque ME acting upon the input shaft GW1 cannot be completely carried out (i.e., is only partially possible). Alternatively, the control unit ECU can receive a signal, which includes the minimum or maximum possible drive torque. Based on this minimum or maximum possible drive torque signal, the control unit ECU calculates whether the reduction of the torque ME acting upon the input shaft GW1 is completely carried out (i.e., is completely possible). In the exemplary profile according to FIG. 3, the reduction cannot be carried out at all (i.e., is impossible), as shown in the profile ME_2. Due to this signal, the torque transmission rate of the shift element to be engaged during the upshift is increased in a second way, as represented in the profile p_zu_2a. After the end of the compensation phase, the torque transmission rate is increased with a steeper ramp, and so it reaches a higher value at the point in time T1 than in the profile p_zu_1. Between the points in time T1 and T3, the torque transmission rate is now increased with a lower slope than in the profile p_zu_1, and so the friction work performed by the shift element does not or does not substantially increase.

A control, increased in this way, of the torque transmission rate of the shift element to be engaged also results in an increase of the acceleration $GW2\_b$, as represented in the profile GW2_b2a. However, the energy released due to the deceleration of the input shaft GW1, as shown in the profile GW1_n2, is now uniformly introduced into the output shaft GW2 throughout the entire upshift, and so the drop in the acceleration GW2b at the end of the upshift is less extreme. Therefore, an improvement of the comfort is achieved in comparison to the profile GW2_b2b.

Figure 4:
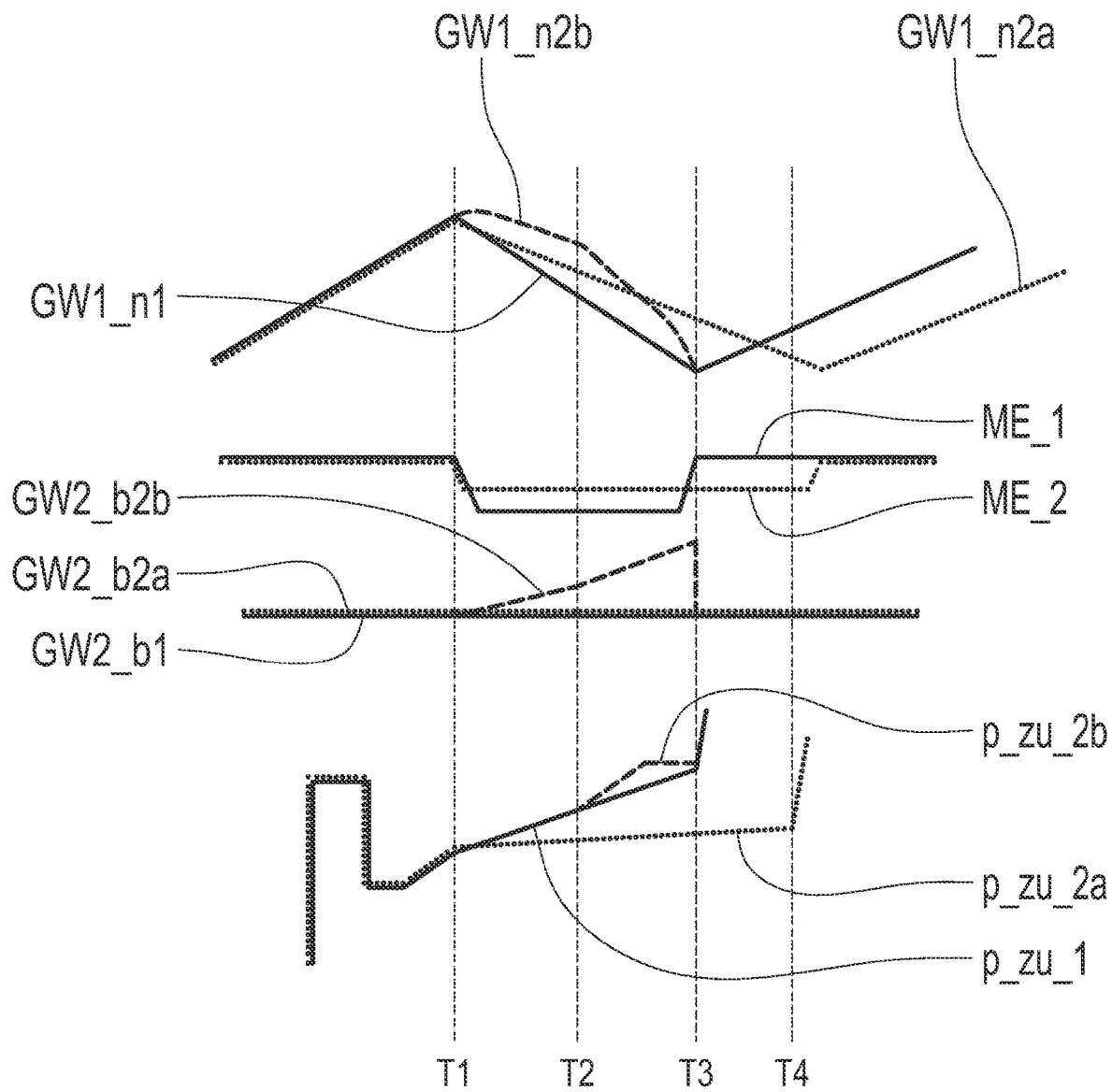
FIG. 4 shows a second example time sequence of various variables of a drive train.

FIG. 4 also shows time profiles of various variables of the transmission G during different variants of an upshift. In contrast to the profiles according to FIG. 3, a reduction of the drive torque is now possible, although only to a reduced extent, represented in the profile ME_2, compared to the full reduction shown in the profile ME_1 and described above. The control unit ECU now receives a signal indicating that the reduction of the drive torque is partly carried out. Alternatively, the control unit itself calculates, based on the received signal, whether the reduction of the torque ME acting upon the input shaft GW1 is completely carried out. Due to this signal, the torque transmission rate of the shift element to be engaged is now controlled by an open-loop or closed-loop system differently than in a case, in which the drive torque reduction could be completely carried out. The duration of the upshift is prolonged by a fixedly predefined value, as is apparent from the profile GW1_n2a. While the upshift in a conventional gear shift according to the profile GW1_n1 is concluded at the point in time T3, the upshift now according to the profile GW1_n2a is prolonged to a point in time T4. In such an operating sequence, the torque transmission rate of the shift element to be engaged during the upshift is also controlled differently by an open-loop or closed-loop system, as represented in the profile p_zu_2a. Starting at the point in time T1, the torque transmission rate now increases with a lower slope as represented in the profile p_zu_2a than in the conventional gear shift according to the profile p_zu_1. The friction work performed by the shift element is approximately the same as in the conventional gear shift. In this way, a good shifting comfort can also be ensured in the case of a reduced available drive torque reduction, as represented in the profile GW2_b1.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS

G transmission
ECU control unit
GW1 input shaft
GW1_n rotational speed of the input shaft
ME torque of the input shaft
GW2 output shaft
GW2_b acceleration of the output shaft
GRS gear set
p_zu control of the torque transmission rate
VM internal combustion engine
ECU-V control unit
EM electric machine
ECU-E control unit
ECU-H control unit
HYM hybrid module
K0 separating clutch
AG differential gear
DW driving wheel

The invention claimed is:

1. A method for operating a power shiftable transmission (G) of a motor vehicle, the transmission (G) including a control unit (ECU), an input shaft (GW1), an output shaft (GW2), a gear set (GRS), and multiple shift elements, the multiple shift elements interacting with the gear set (GRS) for providing various gear ratios between the input shaft (GW1) and the output shaft (GW2), the method comprising:
 transmitting, with the control unit (ECU), a request for a reduction of a drive torque (ME) acting on the input shaft (GW1) for carrying out an upshift;
 determining, with the control unit (ECU), whether the reduction of the drive torque (ME) acting on the input shaft (GW1) is completely possible, partially possible, or impossible based on a signal indicative of whether the reduction of the drive torque (ME) acting on the input shaft (GW1) is completely possible, partially possible, or impossible;
 controlling, with the control unit (ECU), a torque transmission rate of a shift element of the multiple shift elements to be engaged during the upshift according to a first way when it is determined that the reduction of the drive torque (ME) acting on the input shaft (GW1) is completely possible; and
 controlling, with the control unit (ECU), the torque transmission rate of the shift element of the multiple shift elements to be engaged during the upshift according to a second way when it is determined that the reduction of the drive torque (ME) acting on the input shaft (GW1) is partially possible or impossible, the second way differing from the first way,
 wherein the control unit (ECU) controls the torque transmission rate of the shift element of the multiple shift elements by an open-loop system or a closed-loop system.

2. The method of claim 1, wherein, at least at a beginning of the upshift, the torque transmission rate is higher according to the second way than according to the first way.

3. The method of claim 2, wherein, at least at the beginning of the upshift, the torque transmission rate is higher according to the second way than according to the first way by an amount proportional to an extent by which the drive torque is reducible for the upshift.

4. The method of claim 2, wherein, during the upshift, the torque transmission rate is increased by a lesser amount according to the second way than according to the first way.

5. The method of claim 1, wherein:
 a) a duration of the upshift is the same according to the first way as according to the second way, or
 b) when it is determined that the reduction of the drive torque (ME) acting on the input shaft (GW1) is partially possible, the duration of the upshift is longer according to the second way than according to the first way.

6. The method of claim 5, wherein selection between option a) and option b) is dependent on the drive torque that is present and/or on the shift element of the multiple shift elements to be engaged during the upshift.

7. The method of claim 5, wherein an amount by which the duration is longer is fixedly predefined and invariable.

8. The method of claim 5, wherein, during the upshift, the torque transmission rate is lower according to the second way than according to the first way.

9. A control unit (ECU) for open-loop control of functions of a power shiftable transmission (G) for a motor vehicle, the transmission (G) including an input shaft (GW1), an output shaft (GW2), a gear set (GRS), and multiple shift elements, the multiple shift elements interacting with the gear set (GRS) for providing various gear ratios between the input shaft (GW1) and the output shaft (GW2), wherein the control unit (ECU) is configured to:

transmit a request for a reduction of a drive torque (ME) acting on the input shaft (GW1) for carrying out an upshift;

determine whether the reduction of the drive torque (ME) acting on the input shaft (GW1) is completely possible, partially possible, or impossible based on a signal indicative of whether the reduction of the drive torque (ME) acting on the input shaft (GW1) is completely possible, partially possible, or impossible;

control a torque transmission rate of a shift element of the multiple shift elements to be engaged during the upshift according to a first way when it is determined that the reduction of the drive torque (ME) acting on the input shaft (GW1) is completely possible; and control the torque transmission rate of the shift element of the multiple shift elements to be engaged during the upshift according to a second way when it is determined that the reduction of the drive torque (ME) acting on the input shaft (GW1) is partially possible or impossible, the second way differing from the first way.

10. The control unit (ECU) of claim 9, comprising a communication interface for exchanging data with at least one further control unit (ECU-V, ECU-E, ECU-H), wherein the control unit (ECU) is configured to transmit the request for the reduction of the drive torque (ME) acting on the input shaft (GW1) via the communication interface, and wherein the control unit (ECU) is configured to receive the signal indicative of whether the reduction of the drive torque (ME) acting on the input shaft (GW1) is completely possible, partially possible, or impossible via the communication interface.

11. The control unit (ECU) of claim 10, wherein the signal directly indicates whether the reduction of the drive torque (ME) acting on the input shaft (GW1) is completely possible, partially possible, or impossible.

12. The control unit (ECU) of claim 10, wherein the control unit (ECU) is configured to determine whether the reduction of the drive torque (ME) acting on the input shaft (GW1) is completely possible, partially possible, or impossible by calculating whether the reduction of the drive torque (ME) acting on the input shaft (GW1) is completely possible, partially possible, or impossible based on the signal.

13. The control unit (ECU) of claim 10, wherein the at least one further control unit (ECU-V, ECU-E) is configured for open-loop control of an internal combustion engine (VM) or for open-loop control of an electric machine (EM), each of the internal combustion engine (VM) and the electric machine (EM) being a drive source of the motor vehicle.

14. The control unit (ECU) of claim 10, wherein the at least one further control unit (ECU-H) is configured for coordinating a torque output of an internal combustion engine (VM) and a torque output of an electric machine (EM), each of the internal combustion engine (VM) and the electric machine (EM) being a drive source of the motor vehicle.

* * * * *